Nov. 16, 1965   R. W. ESKELSON ETAL   3,217,687
AMPHIBIOUS VEHICLE
Filed May 8, 1964
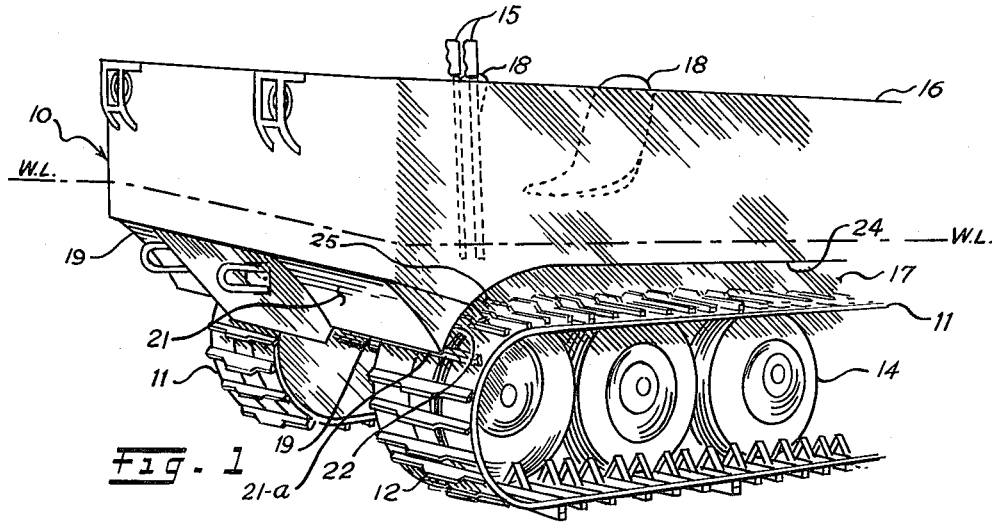
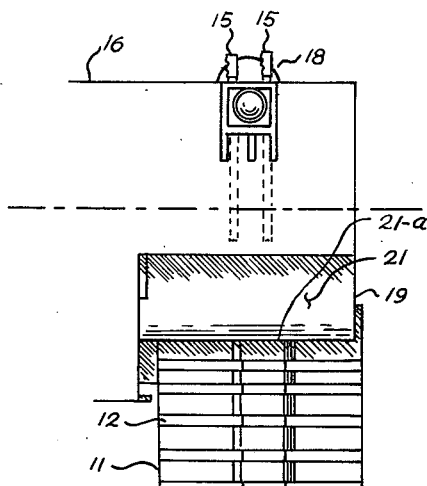
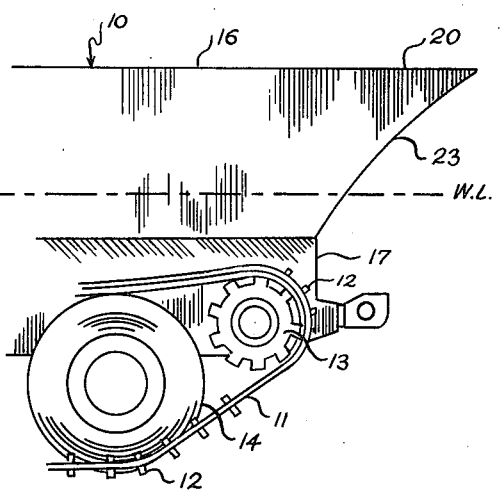
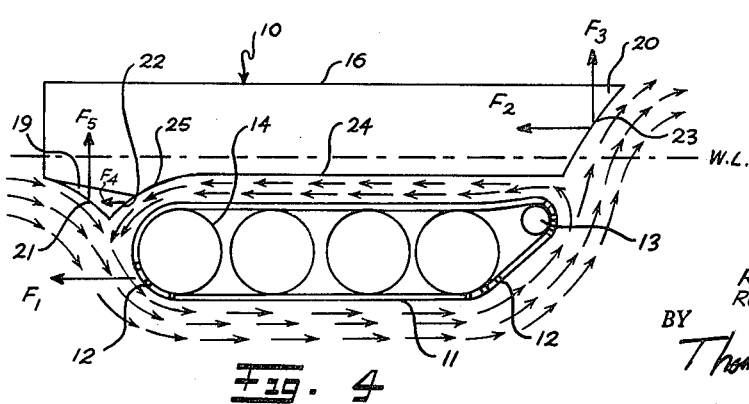
INVENTORS
REX MERRILL BROWN
ROSS W. ESKELSON
BY
Thomas W. Brennan United States Patent Office 3,217,687
Patented Nov. 16, 1965

3,217,687
AMPHIBIOUS VEHICLE
Ross W. Eskelson and Rex Merrill Brown, Smithfield, Utah, assignors to Thiokol Chemical Corporation, Bristol, Pa., a corporation of Delaware
Filed May 8, 1964, Ser. No. 365,945
11 Claims. (Cl. 115—1)

This invention relates to amphibious track laying vehicles and more particularly to improved water propulsion and maneuver control means therefor.

Vehicles of the type herein referred to are intended primarily for operation on land over rough terrain; however, it is important that they also have the capability of operating in water for traversing swamps, bogs, and other bodies of water.

Amphibians provided for this purpose have track laying means such as endless belts disposed on either side of the vehicle which propel it by the rearward movement of the lower portion of the belt contacting the ground. In water, the same means for propulsion is utilized except that a differential force acting on the vehicle must be developed between upper and lower belt portions when the belt is submerged, or provision must be made to insure that the upper belt portion clears the water. The latter alternative is usually impractical of attainment, hence devices such as upper track tunnels, intricately designed drag inducers and the like are used to assist in generating these differential forces to propel the pehicle. In the prior art vehicles these devices have met with varying degrees of success, mostly negative. The reasons are many, among which are increased drag brought about by use of inefficient spoilers which, while mitigating forwardly acting forces developed by the upper belt sections, generate extra drag on the vehicle; and damage to the vehicle and/or the upper parts of the belt by use of covers or tunnels which catch debris and other material encountered in water, which jam the belt traction elements or driving sprocket and otherwise inhibit its motion.

The present invention, however, overcomes these difficulties by providing means for generating upwardly acting forces as well as forwardly acting forces to improve significantly the overall propulsive efficiency of the vehicle without subjecting it to the ill effects above described. In addition to the improved propulsive efficiency obtained through the use of the invention, increased control for maneuvering the vehicle in water has also been found which permits it to be used far more extensively than any of the prior art machines.

Accordingly it is an object of the present invention to provide an amphibious vehicle of the class described which is propelled in an improved manner during operation in a marine environment.

It is another object of the invention to provide a vehicle of the class described which is characterized by its ability to traverse a marine body and maneuver therein with significantly improved propulsive efficiency by incorporation thereon of means to generate augmenting propulsive forces.

It is still another object of this invention to provide an amphibious vehicle which is characterized by incorporation thereon of means to convert the dynamic energy of water flow into a significant forwardly acting thrust on the vehicle.

A further object of the invention is to provide an amphibious vehicle of the class described with fore and aft mounted means acting in cooperation with the moving track laying belt to effect significantly improved propulsion efficiency of said vehicle when traversing a marine environment and maneuvering therein.

These and other objects will become apparent when viewed by one skilled in the art from the following description taken in conjunction with the accompanying drawings in which:

FIG. 1 is a pictorial view of the front end of a track laying vehicle incorporating the invention;

FIG. 2 is a partial, front elevational view of the vehicle of FIG. 1;

FIG. 3 is a side elevational view of the rear end of the vehicle of FIG. 1, and;

FIG. 4 is a schematic diagram illustrative of the augmenting forces generated by use of the invention.

Referring to the drawings, FIG. 1 illustrates a vehicle 10 of the track laying type having an endless belt 11 disposed on each side thereof. Track laying belt 11 is equipped on its outer surface with cleats or ground grippers 12, laterally disposed thereon for securing traction between the vehicle and the medium in or over which it traverses. Vehicle 10 contains a prime mover (not shown) which can be any of the usual engines well known to the skilled artisan using the invention. The prime mover in these vehicles is used to drive a sprocket, as for instance, sprocket 13, through a transmission (not shown) to insure rotation of belt 11 thereabout, thereby propelling vehicle 10 in response thereto. Belt 11 is guided over idler or supporting wheels 14 which support vehicle 10 under conditions of low ground or track pressure. Since supporting or idler wheels 14 are of the pneumatic tire type they lend some buoyancy to the vehicle when used for traversing a water environment. For directional vehicle 10 control, the relative belt 11 motions are varied by changing the relative speeds of driving sprockets 13 on either side of the vehicle. Levers 15, operated by the vehicle driver, are used to apply breaking forces to one or the other depending on the vehicle 10 direction desired.

Vehicle 10 has a body 16 disposed between belts 11 and supported by a chassis 17 as illustrated in FIG. 3. Body 16 contains operator and/or passenger seats 18 which are fixed therein by attachment (not shown) to chassis 17.

Attached to the front underside of vehicle 10 body 16 are a pair of vehicle thrust augmentors, spoilers or deflectors 19 which serve a purpose to be fore fully described with reference to the operation of vehicle 10 in its amphibious use. At the rear end of vehicle 10 body 16 is a transversely extensible after body diverter 20 which, as illustrated in FIG. 3, can be an integral part of body 16. However, depending upon the end use of vehicle 10, diverter 20 can also be made a seperable part thereof. Front thrust augmentors 19 depend from body 16 substantially as shown being disposed above, in front and apart from endless belts 11 and are essentially formed of sheets of metal or the like enclosing a polyhedral solid of triangular cross section and at least two inclined, preferably curved surfaces 21 and 22. Surfaces 21 and 22 which serve a specific function to be more fully explained in what follows with special reference to vehicle 10 operation in a water environment are joined in apex 21–a which extends to a point below the top of track 11 as shown in the drawing. Rear diverter, thrust piece or augmentor 20 also includes at least one inclined, preferably curved surface 23, the function of which will also be later explained.

As indicated by the dash line representing the water level in the drawings, vehicle 10 is at rest in its amphibious use in a water environment. It should be noted that the water level under this condition is above belts 11. Under motion in water it should be noted that practical considerations of vehicle 10 design, generally require that belts 11 will remain substantially submerged. Hence, for best efficiency, elements 19 and 20 are provided and constitute the inventive concept of an improved amphibian described herein.

Operation of the invention is best explained with reference to FIG. 4, which indicates in schematic form the course and movement of water around belts 11 as vehicle 10 is operated in a water environment. As indicated by the arrows of FIG. 4, which are intended to be illustrative of fluid streamlines, the vehicle is moving forwardly, that is, to the left of the drawing. Conversely, of course, if the vehicle 10 is imagined as being stopped or suspended and the water moved toward and around it, the effect thereon is the same insofar as thrust producing forces developed are concerned. As illustrated, the arrows indicate water is flowing toward the front end of vehicle 10 in parallel streamlines until encountered by curved inclined surface 21 of thrust augmentor 19, whereupon it is directed downward in smooth flowing manner toward the outer, lower periphery of belt 11 and track cleats 12. Water continues to flow downwardly, in substantially uniform or parallel streamlines, then around the outer periphery of the front end of belt 11, then rearwardly continuing in substantially parallel streamlines to and around wheel 14, and then upwardly along the rear section of belt 11. Water continues to flow substantially parallel to rearward incline of belt 11, toward inclined surface 23 of rear augmentor 20. Rear augmentor 20, surface 23 is impacted by the water creating an upwardly and forwardly acting force thereby and diverts the water aft of vehicle 10 thereafter. Prior to impacting surface 23, the water divides in the vicinity of sprocket 13 and some of it is carried by the conveying or pumping action of cleats 12 toward the front of vehicle 10, between the bottom 24 of body 16 and the top portions of belt 11. The water traverses the underside of body 16 in substantially parallel streamlines until it is initially diverted downwardly by the inclined, preferably curved, surfaces 25 (of body 16) and 22 of front augmentors or deflectors 19. In being so directed, the water induces upwardly and forwardly acting forces in surface 22 while reducing any tendency to generate unwanted vortexes and/or eddy currents in the moving water.

By causing surfaces 21 and 22 to join in apex line 21–a at a place substantially below the top of belt 11, water diverted from the front of vehicle 10 along surface 21 and from the underside of body 16 along surface 22 is joined with minimal turbulence thereby resulting in minimum interference to the forward movement of vehicle 10. Hence, there results thereby a significant decrease of the usual front end water furrowing usually encountered by amphibious vehicles of this general type.

It is therefore seen that a unique force system is developed which acts on vehicle 10 in a significantly beneficial manner. The force system is represented in FIG. 4 by the lift or vertical forces $F_3$ and $F_5$ and the forwardly acting or thrust forces $F_2$ and $F_4$. The remaining force $F_1$, is the main propelling force or thrust developed by the moving cleats 12 of belts 11. The forces $F_2$, $F_4$, $F_3$ and $F_5$ therefore are representative of the net thrusts acting on vehicle 10 developed by converting the dynamic energy of the moving water into beneficial lift and forward thrust resulting in both increased vehicle 10 water velocity capability and a significantly improved capability for maneuvering therein.

It can further be seen that as a result of the addition to vehicle 10 of the invention herein that other benefits are obtained from the use of thrust augmentors or front deflectors 19 and the rear transverse augmentor 20. For example, increased buoyancy can be achieved by insuring water tight closures thereof; various sizes and configurations of surfaces 21, 22, 23 can be used and have been experimented with and all have generated the beneficial effects referred to above in variation. However, it is preferred to use deflectors or augmentors having upwardly concave surfaces as shown, to achieve best results and most improved performance. In addition, varying degrees of improved maneuverability were also noted, although again best results were achieved with the surfaces in the form herein set forth. The invention is not intended to be limited thereto, however.

As indicated above, this invention is primarily concerned with the production of augmenting forces acting on the surfaces 21 and 22 of deflectors or diverters 19 and on the surface 23 of rear diverter 20. These augmenting forces $F_2$ and $F_4$ are components acting forwardly to give a forward thrust to vehicle 10 and are developed independently by each endless belt 11 on either side of the vehicle. The vertical or lift forces, $F_3$ and $F_5$, act on vehicle 10 rendering increased support in the water during forward motion, and acting in concert with forces $F_2$ and $F_4$ and main propelling force $F_1$, result in a vehicle of improved performance and maneuverability. With regard to maneuverability it has been found that without the invention herein, vehicles of this type are practically uncontrollable without special auxiliary controls such as rudders, jets or the like. With this invention, vehicle 10 is maneuvered in water with the same control gear as on land, i.e., by adjusting the relative speeds of belts 11 with respect to each other. Vehicle 10 so equipped is capable of turning about in the water with about the same response and agility as on land, requiring significantly little more room therein than on land.

It is intended and accomplished, therefore, to present to the art of amphibious vehicles, an amphibian of the track laying type having significantly improved propulsion efficiency when operated in a water environment than was heretofore possible. In addition, the herein described vehicle possesses a degree of maneuverability in water of an order heretofore not possible without the addition of separate auxiliary controls and the like; and finally, these beneficial effects are obtained with no sacrifice on the vehicle's overall operational capability.

What is presented herein then, is an improved vehicle and no undue limitations are to be applied thereto except as set forth in the subtended claims.

What is claimed is:

1. In an amphibious vehicle of the track-laying type having power driven endless belts disposed on each side for propulsion thereof and adapted for operation in water with said endless belts substantially submerged, a body supported by a chassis between said belts and means in said body for independently controlling said belts to propel and maneuver said vehicle on land and water, the improvement comprising, propulsion augmenting means disposed apart and above each of the upper forward portions of said endless belts mounted on said body comprising a first inclined surface for directing water toward the forward portions of the lower periphery of said belts, a second surface inclined substantially opposite said first inclined surface for directing downwardly water conveyed thereto by the upper, forwardly moving portions of said endless belts toward the upper, forward periphery thereof, and means on the rear of said vehicle transversely extensible over and above the rearward portions of said endless belts for deflecting water driven thereagainst by the pumping action of said endless belts thereby providing lifting and forward acting augmenting forces to increase the propulsive efficiency of said vehicle.

2. Means in combination with an amphibious track laying vehicle for increasing the propulsive efficiency thereof, said vehicle having power driven track laying means disposed on each of its sides and adapted for operation with said track laying means substantially submerged when traversing bodies of water comprising, a front deflector mounted on said vehicle and disposed forwardly and above the forward end of said track laying means, a rear deflector mounted on said vehicle and disposed rearwardly and above the rear end of said track laying means, said forward deflectors comprising a pair of inclined surfaces of a width substantially the same as said track laying means, one of said surfaces positioned so as to deflect substantial quantities of water from the front of said vehicle to the lower outer portions of said track laying means thereby providing an upward lifting force on said vehicle and the other surface positioned so as to deflect water conveyed by the upper, forwardly moving portion of said track laying means downwardly toward the forward portions of said track laying means to provide an additional, forward acting, propulsive thrust to said vehicle.

3. Means in combination with an amphibious track laying vehicle for increasing the propulsive efficiency thereof, said track laying means comprising an endless belt disposed on each side of said vehicle and adapted to be operated by a power driven sprocket to provide the main vehicle propulsion on land and water comprising, a pair of thrust augmenting water deflection devices mounted on the forward left and right sides of the main body of said vehicle on the underside thereof, said deflector devices comprising a hollow body of generally triangular shape having a first surface angularly disposed with respect to the water encountered by said vehicle during its traversal therethrough to deflect said water downwardly and rearwardly with respect to said track laying means of said vehicle, a second surface substantially perpendicular to said first surface and disposed apart and above the upper, forward portions of said track laying means to deflect water conveyed thereto by the forwardly moving upper portions of said track laying means downwardly and forwardly with respect to said vehicle, an addition thrust augmenting device integral with said vehicle body at the rear thereof and formed with an undersurface rearwardly disposed above said track laying means and adapted to deflect water conveyed thereto by the rearwardly and upwardly moving section of said track laying means, and means in said body for controlling the relative speeds of said track laying means.

4. The combination of claim 2 wherein at least one surface of said deflection devices is a plane surface.

5. The combination of claim 2 wherein at least one of said surfaces of said deflectors is curved.

6. The vehicle of claim 1 wherein the thrust augmenting means are integral with said body.

7. The vehicle of claim 1 wherein said thrust augmenting means comprises at least one plane surface.

8. The vehicle of claim 1 wherein said thrust augmenting means comprises at least one curved surface.

9. The combination of claim 3 wherein at least one surface of said deflector devices is a plane surface.

10. The combination of claim 3 wherein at least one surface of said deflector devices is a curved surface.

11. An amphibious vehicle of the track laying type having endless belts disposed on each side thereof, said endless belts operative though submerged, comprising a chassis, a body mounted on the chassis, means in the body for controlling the relative motions of the endless belts, means for propelling the belts to give motion to the vehicle, a water deflector mounted on the front of said vehicle on the underside of said body positioned over and spaced apart from the upper, forward portions of said belts comprising a downwardly directed forward surface for deflecting water encountered by said vehicle when moving forwardly therein, an upwardly directed surface connected to said forward surface for deflecting downwardly and forwardly water conveyed thereto by the upper portions of said endless belts, said surfaces connected at a line of intersection below the top of said endless belts, and a rear surface upwardly directed and disposed on said body for deflecting water impacted thereagainst by the rearwardly moving lower portions of said endless belts.

References Cited by the Examiner
UNITED STATES PATENTS

| | | | |
|---|---|---|---|
| 2,091,958 | 9/1937 | Braga | 115—0.5 |
| 2,941,494 | 6/1960 | McBride | 115—1 |

FERGUS S. MIDDLETON, *Primary Examiner.*

ANDREW H. FARRELL, *Examiner.*